United States Patent Office 2,943,910
Patented July 5, 1960

2,943,910

METHOD OF REMOVING HYDROGEN SULFIDE FROM GASEOUS MIXTURES

Giuseppe Giammarco, Porto Marghera, Italy, assignor to S.p.A. "Vetrocoke," Turin, Italy Filed June 29, 1956, Ser. No. 594,775

Claims priority, application Italy June 30, 1955

11 Claims. (Cl. 23—2)

This invention relates to the removal of hydrogen sulfide alone or together with carbon dioxide and further acid gases from gaseous mixtures by scrubbing by means of absorbing liquids.

At the present state of the art methods of removing hydrogen sulfide by scrubbing by means of absorbing liquids are objectionable in that removal is incomplete and operation at high temperature is impossible. Moreover, when it is desired to directly convert the absorbed hydrogen sulfide to elemental sulfur as in so-called oxidizing methods, the latter are further objectionable in that they are unsuitable when carbon dioxide exceeds a certain degree of concentration, moreover considerable secondary oxidizing reactions occur, more particularly formation of thiosulfate.

The object of this invention is to thoroughly purify gaseous mixtures from hydrogen sulfide; a further object is to perform said complete removal at high temperatures; a further object is to remove hydrogen sulfide alone, even in the presence of carbon dioxide at any concentration and at superatmospheric pressure, or jointly therewith, converting hydrogen sulfide to elemental sulfur; a further object is to provide a thoroughly selective method in respect of the separation between hydrogen sulfide and carbon dioxide; a further object is to remove hydrogen sulfide by means of apparatus of reduced size and more inexpensively, a further object being to avoid objectionable secondary reactions.

According to the improved method a gaseous mixture containing hydrogen sulfide, possibly jointly with carbon dioxide even at a high concentration, is contacted with an aqueous solution which in operational conditions contains as effective agents an alkaline arsenite (arsenious anhydride) and arsenate: arsenite initially binds hydrogen sulfide as thioarsenite, and alkaline arsenate is contained in a ratio of at least 3 moles to each mole thioarsenite formed, that is, at least 1 mole arsenate to each mole absorbed hydrogen sulfide so that hydrogen sulfide is finally bound as monothioarsenate (attention is drawn on the fact that the effective agents employed in this method, that is arsenite and arsenate, are non-sulfuretted compounds of arsenic); the monothioarsenate containing solution is thereupon reduced in alkalinity through any process whereby monothioarsenate is decomposed to arsenite and elemental sulphur, the arsenite thus formed being then oxidised to arsenate so as to re-establish the correct proportions of arsenite and arsenate defined above, the solution thus re-activated being finally returned to absorption stage, thereby closing the operational cycle.

The term arsenite as used throughout the specification includes not only neutral arsenite ($M_3AsO_3$) of alkali metals or ammonium, but also acid arsenites ($M_2HAsO_3$ and $MH_2AsO_3$) or arsenious anhydride in a free state physically dissolved in the aqueous solution of alkaline salts, that is, it generally defines the presence in the solution of the arsenious acid ion.

The term thioarsenite ($M_3AsS_3$), this being a sulfuretted compound of trivalent arsenic, includes arsenic sulphide $As_2S_3$ and thioarsenites of various kinds deriving therefrom by dissolving in aqueous alkaline solutions.

The term arsenate is used to define the compound formed with alkali metals or ammonium by the pentavalent arsenic bound to oxygen, either of a neutral or acid nature ($M_3AsO_4$ and respectively $M_2HAsO_4$ or $MH_2AsO_4$).

The term monothioarsenate is used to define the sulfuretted compound of the pentavalent arsenic $M_3AsO_3S$. This is the compound in which to 1 arsenic atom there corresponds 1 sulphur atom, that is the compound poorest in sulphur and richest in oxygen among salts of sulfur and arsenic, the improved process being based on the presence of this compound, higher sulfuretted compounds being avoided.

The symbol M appearing in the formulae above stands for an alkali metal such as Na, K or else an alkaline reacting inorganic compound such as $NH_4$. In addition to the above mentioned tribasic compounds, dibasic and monobasic compounds can likewise be used.

Figure 5:
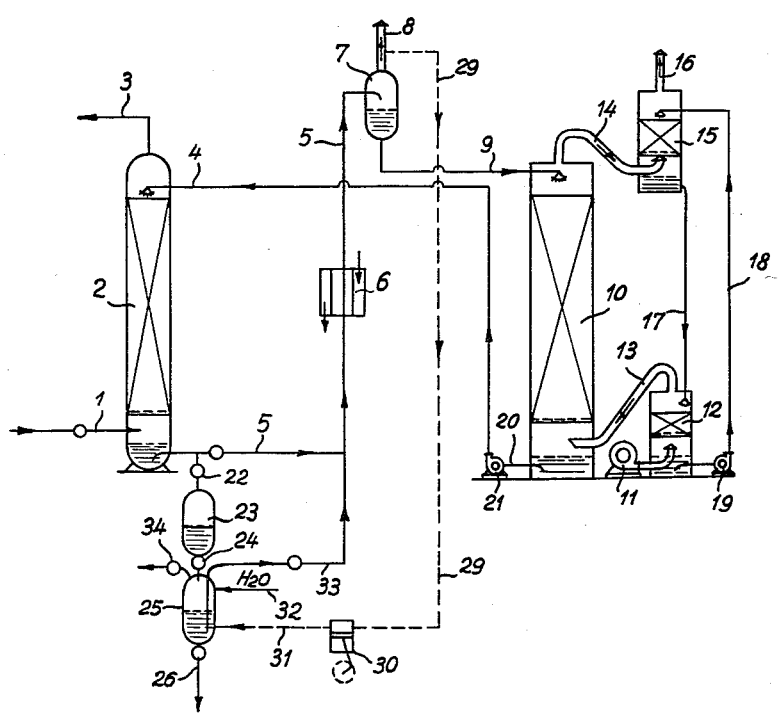

Figure 5 diagrammatically shows a plant for a simultaneous absorption of hydrogen sulfide and carbon dioxide.

The operational cycle of this method comprises four steps, hereinafter referred to as absorption, digestion, acidification and oxidation, which can be performed either separately or jointly in one or more apparatus or compartments according to practical conditions.

In the absorption step the gaseous mixture is contacted with an aqueous solution containing an alkaline arsenite which is capable of reacting with the hydrogen sulfide to form thioarsenite, that is, a sulfuretted compound of trivalent arsenic. To this end, the proportion of arsenite in the solution should be at least sufficient to bind all the hydrogen sulfide contained in the gaseous mixture to be purified; for practical purposes, a large excess of arsenite is highly recommendable, permitting on one hand a quick and full removal of hydrogen sulfide, and, on the other hand, advantageously assuring a decomposition of any alkaline thiosulfate which might be formed in the solution due to secondary reactions. The pH value of the solution in the absorption step advantageously ranges between 6.6 and 7.8.

The digestion step is based on a chemical conversion of the thioarsenite due to the presence of arsenate in a proportion of at least 3 moles arsenate to 1 mole thioarsenite, the general reaction scheme being as follows:

(A)  $M_3AsS_3 + 3M_3AsO_4 = 3M_3AsO_3S + M_3AsO_3$

According to this reaction, the sulfur in the thioarsenite goes over to the arsenate forming monothioarsenate, while thioarsenite is returned to arsenite. This reaction requires a period of time, and this is the reason wherefore the reaction has been termed "digestion" step. The digestion is accelerated either by excess of arsenate or by a rise in temperature. Owing to the arsenate content in the absorbing solution, the digestion already partly occurs in the absorption step, whereby the method is more particularly suitable for a high temperature absorption.

Figure 1:
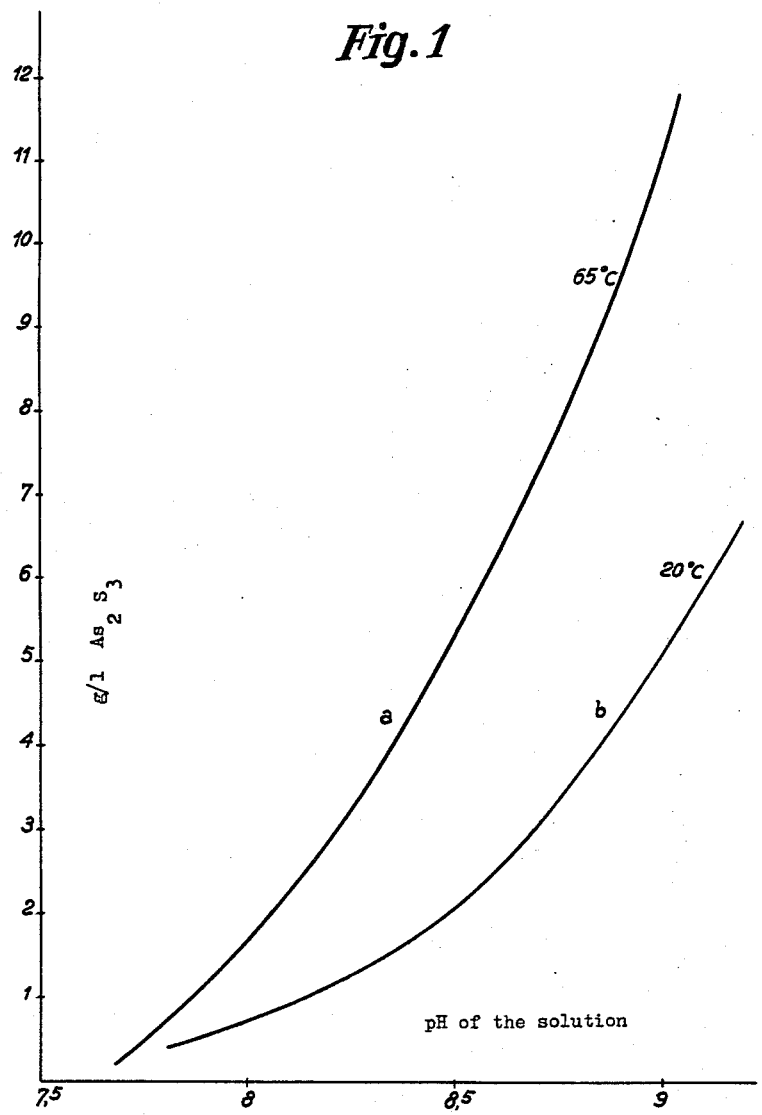
Figure 1 is a solubility diagram of arsenic sulfide in an absorbing solution of this invention.

It has been ascertained, moreover, that the digestion phenomenon makes the absorbing solution extraordinarily stable with respect of carbon dioxide and or oxygen. Prior methods, which employ absorbing solutions containing in operative conditions multisulfuretted compounds of pentavalent arsenic ($M_3AsS_3O$; $M_3AsS_4$ and the like), are ineffective already at atmospheric pressure where the gaseous mixture to be purified contains as little as 10–15% carbon dioxide, the acidic character of the latter lowering the alkalinity of the absorbing solution thereby causing arsenic sulfide contained therein to precipitate. This results from the diagram in Figure 1, wherein pH values of the alkaline absorbing solution are shown as abscissae, the ordinates showing the maximum concentration (grams/litre) of arsenic sulfide capable of being maintained in the solution in dissolved condition. The curve $a$ applies to a temperature of 65° C., the curve $b$ applying to a temperature of 20° C. It will be seen that carbon dioxide by reducing the pH value of the solution considerably lowers the solubility of arsenic sulfide.

On the contrary, the digestion step claimed herein, that is, the above explained conversion of thioarsenite giving rise to monothioarsenate makes the solution extremely stable with respect of carbon dioxide in ordinary absorption conditions, the stability of the solution being modified only by a treatment prolonged over hours, involving a chemical reaction of a particular kind, advantageously utilised in this method in a manner and for the purposes which will be described in detail hereinafter.

For what concerns oxygen and oxygen-containing gases, it is known that multisulfuretted arsenic compounds of the prior methods quickly oxidize when contacted with air, giving rise to thiosulfate by an extend increasing with the alkalinity and temperature of the solution. On the contrary, the digested solution of this method results the more stable with respect of oxygen the more alkaline is the solution, the stability being largely unaffected by rise of temperature. Any thiosulfate which might have been formed through secondary reactions is decomposed herein by the arsenite according to a reaction of the type:

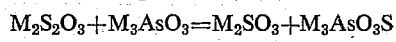

$$M_2S_2O_3 + M_3AsO_3 = M_2SO_3 + M_3AsO_3S$$

giving rise to monothioarsenate (which is re-utilized as the typical compound of this method) and thiosulfate, which can be readily converted to sulfite and sulfate, both easily separable from the solution by crystallisation. The above decomposition is favourably affected by rise in temperature and alkalinity, which makes the method still more advantageous for use at high temperatures. On account of the digestion already starting during absorption, the arsenite produced by the Recation A above is advantageously available for the purposes of hydrogen sulfide absorption and calculations inherent thereto.

A thorough digestion is however essential in this method, the exhausted solution being therefore allowed to dwell in a suitable compartment over a period of time depending upon temperature and excess arsenate till the digestion is completed, which is checked in practice by ascertaining whether a sample of the digested solution no longer deposits arsenic sulfide on prolonged treatment by means of a stream of gaseous carbon dioxide.

In the acidifying step the exhausted digested solution is regenerated, whereby elemental sulphur (this being the final product to which the absorbed hydrogen sulfide is converted is separated and pentavalent arsenic is converted trivalent arsenic, that is, arsenite which is the compound on which this method is based for absorbing hydrogen sulfide; the regenerated arsenite is therefore recirculated.

The reaction which appears to best explain the acidifying step is:

(B) $$M_3AsO_3S = M_3AsO_3 + S$$

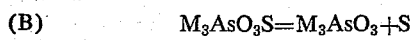

from which it will be seen that monothioarsenate decomposes to arsenite and elemental sulphur, the said reaction being all the more thorough as the alkalinity of the solution is further reduced. From the practical standpoint, it should first of all be noted that like the digestion this reaction too takes a period of time. The said further reduction in alkalinity can be advantageously performed by treating the digested solution with carbon dioxide. Moreover, it should be noted that not all the sulphur in the monothioarsenate is capable of separation by reduction in alkalinity (acidification); the sulphur quantity remaining in solution as monothioarsenate can be however decreased, not only by extending the time of treatment by carbon dioxide, but also by raising the pressure at which carbon dioxide is caused to act, or by diluting the solution itself.

Figure 2:
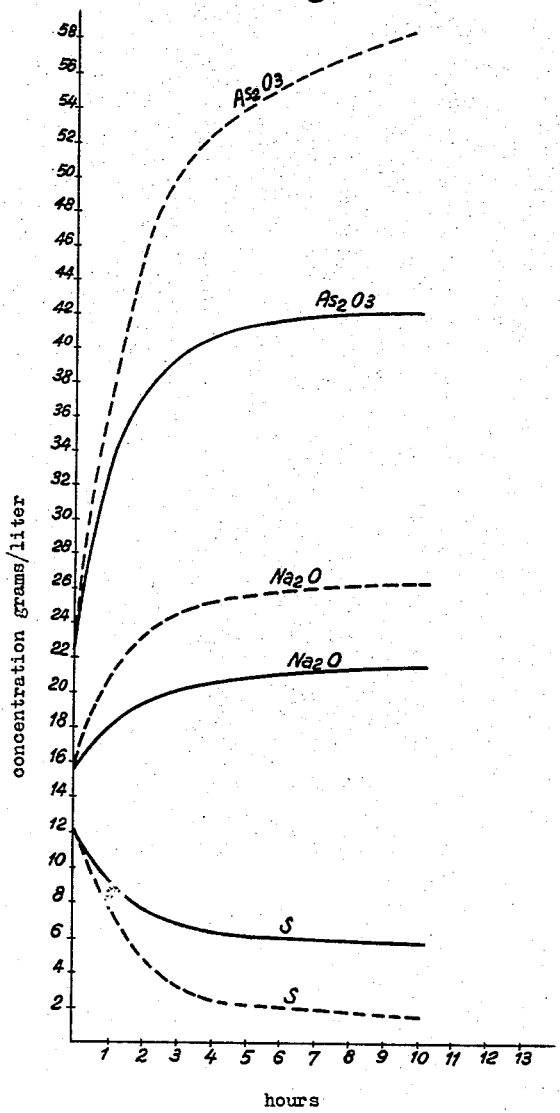
Figures 2, 3 and 4 are diagrams illustrative of the step in which alkalinity of the solution is reduced and monothioarsenate is decomposed.
Figure 3:
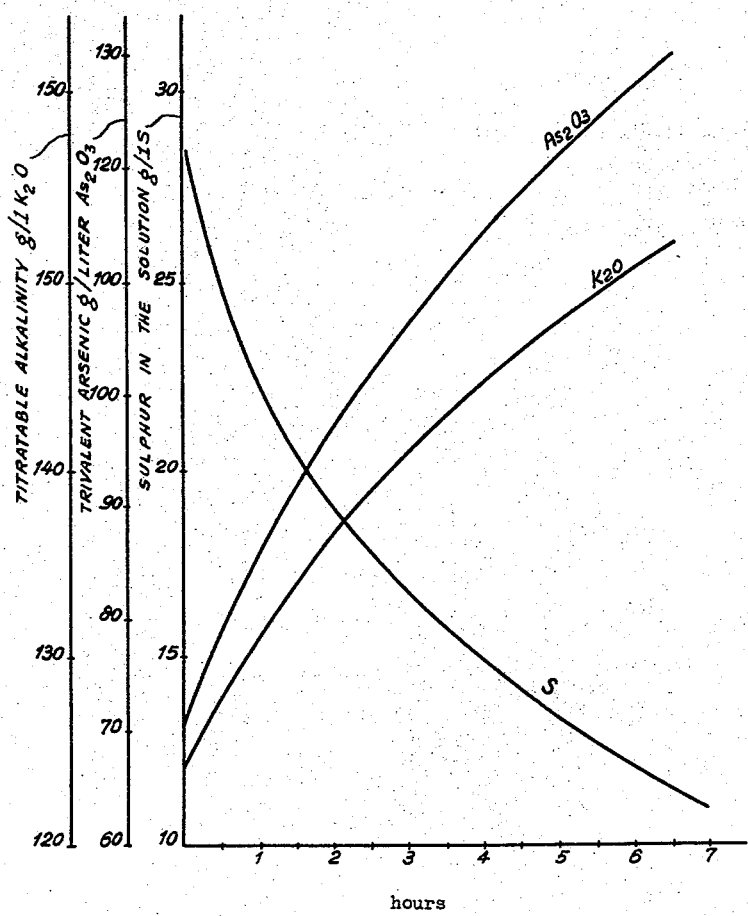
Figure 4:
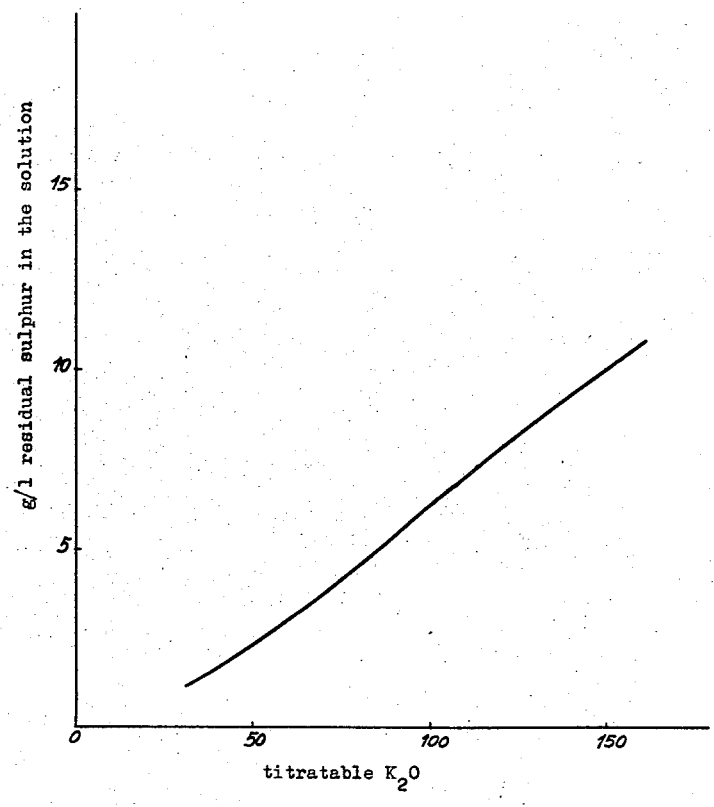

A number of results of my investigations appear in the diagrams of Figures 2, 3 and 4 which will make the process better understood.

The diagram of Figure 2 relates to low alkalinity solutions. It shows that a solution initially containing 15.6 g./liter $Na_2O$ capable of titration by methyl-orange, 46.4 g./liter pentavalent arsenic (as $As_2O_3$), 22.0 g./liter trivalent arsenic (as $As_2O_3$) and 12.3 g./liter sulphur bound with monothioarsenate, is modified with time by the action of pure carbon dioxide at a pressure of 1 atm. (full lines on the diagram) and at a pressure of 6 atm. (dash lines). The abscissa shows the time in hrs., the ordinates showing the g./liter concentrations of the various constituents of the solution being considered. It will be seen that the sulphur content rapidly decreases during the first hours, the decrease becoming then slower, the titratable alkalinity of the solution and quantity or free arsenite increasing accordingly; the process being much quicker with carbon dioxide at 6 rather than at 1 atm. For instance, by operating with carbon dioxide at 1 atm., 12.3−6.7=5.6 kgs. sulphur per m.³ solution separate after three hours. By operating at 6 atm., after an equivalent period 12.3−3.0=9.3 kgs. sulphur per m.³ solution separate. It is submitted that both said values are of great interest in industrial practice, as they denote that the quantity of sulphur which can be recovered by volume unit of the solution is appreciably high, so that the volume of solution to be circulated for carrying out the cycle is considerably reduced.

The diagram of Figure 3 shows that a solution initially containing 123.8 g./liter $K_2O$ capable of titration using methyl-orange indicator (g./l. concentration on the axis of the ordinates) 70 g./l. trivalent arsenic (as $As_2O_3$) (g./l. concentration on the axis of the ordinates), 96.4 g./liter pentavalent arsenic (as $As_2O_3$) and 28.3 g./liter sulphur (g./l. concentration on the axis of the ordinates), separates elemental sulphur as a function of time (plotted in hrs. on the axis of the abscissae) during a treatment by carbon dioxide at a pressure of 4 atm.

The diagram of Figure 4 discloses the results of my experiments relating to the residual sulphur content in the solution after treatment by carbon dioxide. The g./liter $K_2O$ concentration of alkaline solutions containing monothioarsenate is given as abscissae, and the ordinates denote the g./l. residual sulphur concentration in the solution, expressed as sulphur, after treatment to equilibrium by carbon dioxide at a pressure of 4 atm. at a temperature of 40° C. So, for instance, solutions containing 50, 100 and 150 g./l. $K_2O$ capable of titration using methyl-orange indicator contain on completion of treatment a residual sulphur quantity equalling 2.5; 6.2 and 10.0 g./l., respectively. Beyond the 150 g./l. $K_2O$ concentration the curve is of no practical value, since the solubility of potassium bicarbonate does not permit of exceeding the said $K_2O$ concentration. Consequently, by treating by carbon dioxide a solution of the above type of higher $K_2O$ concentration, the solution separates a solid phase, comprising bicarbonate crystals and elemental sulphur, and a liquid phase of a 150 g./l. $K_2O$ concentration at room temperature with a residual sulphur content of about 10 g./l.

Similarly with sodium solutions, the residual sulphur quantity increases on increase in concentration of the solution up to the maximum limit corresponding to solubility of sodium bicarbonate which amounts to about 40 g./l. $Na_2O$.

As a whole, the modifications made to the solution by the two Reactions A and B referred to above separately and in detail, can be represented by the following equation:

(C) $\quad M_3AsS_3 + 3M_3AsO_4 = 4M_3AsO_3 + 3S$ which discloses that thioarsenite regenerates arsenite separating sulphur, arsenate being at the same time reduced to arsenite.

Besides by the acidifying action developed by the carbon dioxide, the above chemical modifications can be effected by conveniently lowering the alkalinity of the solution by other methods also, for instance by removing ammonia from solutions comprising ammonium salts, or by oxidising the alkaline arsenite which by conversion to the less hydrolyzable arsenate, lowers the pH value of the solution.

Said chemical modifications also occur when the alkalinity of the solution is already initially sufficiently low, the pH value ranging between 6.6 and 7.6. In this case precipitation of elemental sulphur occurs as trivalent arsenic sulphide is added to the solution or formed therein as a reaction product of hydrogen sulfide and arsenite contained in the solution.

From the above discussion of the processes inherent to Reactions A and B and sum Reaction C it is clear that the arsenate consumption is a quantity stoichiometrically corresponding to the quantity of hydrogen sulfide which has been absorbed and converted to elemental sulphur. It is therefore necessary for the expended arsenate which, as mentioned above, has been reduced to arsenite, to be re-formed by a corresponding re-oxidation of the arsenite produced. For this purpose it will be sufficient for part or all the absorbing solution containing arsenite to be oxidised by methods well known in the art, for instance by treatment by air or other oxygen-containing gases. This treatment by air is preferred, because it permits of removing from the solution the absorbed carbon dioxide.

I ascertained a further advantage deriving from the adoption of Reactions A, B and C described above. It is known that in all oxidising processes thiosulphate accumulates in the solution and cannot, on account of its high solubleness, be removed from the circuit without removing part of the absorbing solution at the same time. In my improved method it was found that by reason of the high concentration of both alkali and arsenite in the solutions employed, the thiosulphate is decomposed by arsenite forming monothioarsenate and sulphite according to the reaction:

$$Me_2S_2O_3 + Me_3AsO_3 = Me_2SO_3 + Me_3AsO_3S$$

The monothioarsenates are utilised in Reaction B separating sulphur and re-forming arsenite, while sulphites, ultimately the sulphates to which they are converted by virtue of their lower solubility are readily removable from the solution simply through crystallisation.

Therefore, one of the characteristic features of my improved method consists in the fact that thiosulphate does not accumulate in the solution but is decomposed. To this end part or all the alkaline solution containing arsenite is heated, preferably to its boiling temperature and kept at this temperature long enough for the thiosulphate to decompose. It should be noted that this treatment of the solution is superfluous when, as explained hereafter, the practice of the method includes per se a boiling step as in the case of simultaneous absorption of hydrogen sulfide and carbon dioxide.

Having now cleared the experimental basis, the manner of carrying out the regeneration procedure for the exhausted absorbing solution will now be described.

The hydrogen sulfide absorbing step should be carried out in a manner similar to the above. The alkalinity of solution should be high enough to avoid precipitations of arsenic sulphide and elemental sulphur under the temperature and partial pressure conditions of the carbon dioxide being absorbed. Separation of solid sulphide shall be prevented, as mentioned above, by the presence of alkaline arsenate in the solution, which shall be employed in a larger quantity where the mixture to be purified is very rich of hydrogen sulfide.

Solutions of the above mentioned type are preferable, because precipitations of sulphur or arsenic sulphide at the absorbing step would entail obstructions and prevent flow of gas; however, in certain special practice of the method it may be preferable to employ a solution, the alkalinity of which is already initially low enough, that is, reaches the abovementioned pH value ranging between 6.6 and 7.8 and is therefore capable of separating sulphur and regenerating arsenite as the latter absorbs hydrogen sulfide.

The exhausted solution containing thioarsenite produced by the absorption reaction and arsenate which was previously present therein, is removed from the apparatus in which absorption is carried out and introduced into a second apparatus for the digestion step. The solution is kept in the latter during a period of time sufficient for completion of the digestion Reaction A, said period being shorter as the temperature is higher; as mentioned above an operating temperature of 40–50° C. and excess arsenate are advisable. Consequently, if absorption has been effected in the cold it is advisable, but not strictly necessary, to heat somewhat the exhausted solution.

Upon completion of digestion, the solution is conveyed to a third apparatus, where the acidifying step is carried out by the action of carbon dioxide, elemental sulphur being simultaneously separated. I have ascertained that the use of carbon dioxide in a diluted condition, as generally occurs in combustion gases, is already sufficient to bring about sulphur separation and regeneration of the solution. When operating at atmospheric pressure, more particularly by diluted carbon dioxide, solutions of low alkalinity are conveniently preferred on account of the fact that, as disclosed by the diagram of Figure 4, the use of diluted solutions affords lower pH values and a more thorough reduction of the residual sulphur content in the solution. As distinct therefrom, the use of concentrated carbon dioxide, more particularly at superatmospheric pressure, affords the advantage of increasing the sulphur quantity which can be recovered per unitary volume of the solution, consequently reducing the quantity of circulating solution and the requisite equipment for carrying out the method, so that it is very often economically more convenient to employ superatmospheric pressure, even where carbon dioxide is available in a diluted condition.

It should be recalled here that the characteristic feature of this method is that it provides the possibility of utilising either directly or indirectly for regenerating exhausted solutions the same carbon dioxide which mostly accompanies hydrogen sulfide in gaseous mixtures to be purified. As a matter of fact it will be sufficient to contact the absorbing solution long enough with the gaseous mixture to be purified containing carbon dioxide at a concentration of 7–10% at least, for the latter to decrease the alkalinity of the solution by a sufficient extent for the regeneration reaction and sulphur separation to take place. This is equivalent to carrying out the digestion and acidifying processes in the same zone in which absorption is effected.

Alternatively, the digestion can be performed or at least completed by employing the carbon dioxide desorbed from the solution in the oxidizing step.

The latter is advantageously carried out by means of air and involves a decrease in the alkalinity of the solution on account of the fact that trivalent arsenic passing to a pentavalent form consumes a corresponding amount of alkali. This reduction in alkalinity (acidification) is sufficient to cause elemental sulphur to separate where low-alkaline solutions are employed having their pH value ranging between 6.6 and 7.8, the separation of sulphur starting already during the absorption step and being completed in the oxidation-acidification step above.

The oxidation step re-establishes the arsenate quantity consumed in the previous steps. When applied to gaseous mixtures containing both hydrogen sulfide and carbon dioxide, the oxidation step is advantageously performed in a manner as to simultaneously expel from the solution the absorbed carbon dioxide; in this event, a separate treating zone is established, preferably operating at an increased temperature, wherein the incoming digested and acidified solution is intimately contacted with an oxygen-containing gas (e.g. air), whereby simultaneously arsenate is re-formed and carbon dioxide expelled, thereby restoring the alkalinity of the solution to the value suitable for adsorption; the solution so regenerated is then recirculated to the absorption step.

In a further embodiment of this method, which applies to gaseous mixtures containing jointly hydrogen sulfide and oxygen (air), oxidizing step is performed in the absorption zone. In such a case, the Reaction A simultaneously occurs, whereas arsenite is oxidized to arsenate by the oxygen contained in the gaseous mixture; a consequent reduction in alkalinity causes elemental sulphur to separate from the monothioarsenate according to the Reaction B, whereby the operational cycle of this method closes in a single apparatus or zone where all four steps take place without discontinuities. Low-alkaline (pH 6.6–pH 7.8) absorbing solutions are used to this end.

When solutions containing ammonium salts are used, the acidifying step can be simply performed by removing from the solution part of the ammonia contained therein. This can be done by distilling, preferably in vacuum. The removed ammonia is conveniently re-circulated so as to restore at the absorption step the requisite alkalinity. Otherwise, ammonia can be removed from the solution by a stream of a gas, such as the oxygen-containing gas employed in the oxidizing step; a subsequent scrubbing by an acid permits a recovery of the ammonium salt to be re-circulated to the absorption step.

When simultaneously absorbing hydrogen sulfide and carbon dioxide absorbing solutions are adopted having a considerable alkali concentration and an arsenious anhydride content preferably corresponding to the formation of orthoarsenite ($M_3AsO_3$) and metaarsenite ($MAsO_2$) in the absorbing solution. Furthermore, the solution should contain a comparatively high amount of arsenate ($M_3AsO_4$), which keeps thioarsenite against precipitating arsenic sulphide by virtue of the presence of carbon dioxide, as explained in connection with Reaction A. Conditions for Reaction A are more favourable when absorption is carried out at an increased temperature; however, it was ascertained that for cold absorption it will be sufficient to employ an appreciable excess of alkaline arsenate.

At the regeneration step the digestion reaction is first completed on the solution, which then undergoes acidification through direct or indirect use of the carbon dioxide in the gaseous mixture to be purified, as will be explained hereafter with reference to a special example illustrated in Figure 5. The solution then undegoes the carbon dioxide expulsion process which removes carbon dioxide through boiling, whereupon it undergoes oxidation through treatment by air which simultaneously cools the solution and removes the remaining carbon dioxide quantity therefrom. It is known however that boiling the solution can be avoided, as heating to, for instance, 80–90° C. is sufficient for its carbon dioxide content be removed through treatment by air in the oxidation process.

The practice of the method of simultaneously absorbing hydrogen sulphide and carbon dioxide from a compressed gaseous mixture as illustrated in Figure 5 will now be described.

The gaseous mixture to be purified is admitted at superatmospheric pressure through pipe 1 into the scrubbing tower 2, which it leaves at 3 purified from its hydrogen sulphide and carbon dioxide content through scrubbing by means of the absorbing solution admitted at 4. In addition to the absorption step the digestion process is in part carried out in tower 2.

The exhausted solution is discharged at the bottom of the absorption tower 2, reaches through pipe 5 upon heating at 6 through a suitable heating means, an expansion vessel 7 in which the absorbed carbon dioxide is evolved in a pure condition and is conveyed through 8 for further use. By virtue of the relatively high temperature ranging between 50–90° C. in the vessel 7 the digestion reaction is safely completed.

The solution falls from the vessel 7 through 9 into the tower 10 in which carbon dioxide expulsion and oxidation take place. The carbon dioxide in the solution is expelled by means of an air stream in a manner known per se. Air is sucked by the fan 11, heated and moistened in tower 12 by means of hot water and admitted at 13 to the regeneration tower 10, which it leaves at 14 admixed with carbon dioxide and in a hot condition, its heat being recovered in the smaller tower 15 by means of cold water, the solution being ultimately discharged to the outside at 16. The necessary water for heat recovery at 15 and heating at 12 is circulated through pipes 17 and 18 by the pump 19.

In addition to expelling carbon dioxide air further oxidises in tower 10 arsenite to arsenate, as required for separating sulphur during acidification. The oxidising action by air in tower 10 does not form any appreciable thiosulphate quantity in the solution, the sulphur having gone over from thioarsenite to monothioarsenate on completion of the digestion process at 7.

The regenerated solution which is free of carbon dioxide and is oxidised by the desired extent, is sucked through pipe 20 by the pump 21 and re-admitted under pressure through 4 to the top of tower 2.

For regenerating the sulphuretted arsenic compound, part of the solution is drawn through 22 and admitted to a pressure vessel 23 in which the digestion process between thioarsenite and arsenate, both contained in the solution, may be completed. The solution is then discharged through 24 into the vessel 25 which is likewise at superatmospheric pressure. Acidification is effected in the latter by carbon dioxide, the separated sulphur being drawn off at 26. Acidification may be improved by diluting the solution by introducing water through 32.

The carbon dioxide employed is that evolved in a pure condition in the expansion vessel 7, is drawn off through pipe 8 and conveyed through line 29 to the compressor 30, delivering it through line 31 at the desired pressure to the acidifying vessel 25. Excess carbon dioxide is discharged through 34.

The solution is discharged from vessel 25 through outlet 33 to the pipe 5 by which it is conveyed with the remaining solution to the above described carbon dioxide expelling and oxidising process, the separated sulphur being discharged through valve 26.

Instead of using in the acidification zone 25 pure carbon dioxide delivered by the compressor 30, the acidification step can be performed by utilizing the gaseous mixture to be purified; to this end, part of the mixture flowing through the conduit 1 can be conveyed through the acidification vessel 25 and then returned to the conduit 1 immediately ahead of the absorption tower 2.

Detailed examples of the manner of carrying out the method will now be described.

*Example 1.*—A gas at a pressure of 5 atm. containing 20% $CO_2$ and 24.2 g. $H_2S/m.^3$ (S.T.P.) is scrubbed at a liquid/gas ratio 1:950 by means of a solution which at the inlet to the absorption step is as follows:

Alkalinity titratable by methyl-orange___ $K_2O$=100 g./l.
Non-sulphuretted trivalent arsenic_____ $As_2O_3$=40 g./l.
Pentavalent arsenic as arsenate and monothioarsenate_____. $As_2O_3$=81 g./l.
Sulphur as monothioarsenate_____ S=7.2 g./l..

Upon absorption the solution of which the sulphur content has risen to 28.9 g./liter is conveyed to an apparatus in which digestion is carried out, whereupon it is treated by $CO_2$ at a pressure of 4 atm. to precipitate as elemental sulphur 21.7 kgs. sulphur to one m.$^3$ of treated solution. The analysis of the acidified solution is as follows:

Alkalinity titratable by methyl-orange_____ $K_2O$=131.9 g./l.
Non-sulphuretted trivalent arsenic____. $As_2O_3$=107.2 g./l.
Pentalavent arsenic as arsenate and monothioarsenate_____ $As_2O_3$=23.8 g./l.
Sulphur as monothioarsenate_____ S=7.2 g./l.

This solution is subjected to a treatment by air in order to oxidise to arsenate the arsenite (equalling 67.2 g./l. $As_2O_3$) formed on acidification. At the same time, the air also expels carbon dioxide bound by the said acidification, restoring the solution to its starting composition for reutilisation in absorption.

*Example 2.*—4,000 m.$^3$/h. (S.T.P.) coke oven gas with a 3.6 g. $H_2S$/m.$^3$ (S.T.P.) content are scrubbed at atmospheric pressure by means of 8 m.$^3$/h. solution prepared from sodium carbonate, arsenite and sodium arsenate of the following analysis under operating conditions at the inlet to absorption:

Alkalinity titratable by methyl-orange___ $Na_2O$=9 g./l.
Non-sulphuretted trivalent arsenic_____ $As_2O_3$=35 g./l.
Pentavalent arsenic as arsenate and monothioarsenate_____. $As_2O_3$=32 g./l.
Sulphur as monothioarsenate_____ S=3.5 g./l.

The solution leaving the absorption tower contains 5.3 g./l. sulphur and has already effected most of the digestion reaction which is completed in a special container; the subsequent treatment by $CO_2$ at 20% concentration at atmospheric pressure precipitates 13.6 kg./h. elemental sulphur, the composition of the solution becoming:

Alkalinity titratable by methyl-orange_____. $Na_2O$=10.75 g./l.
Non-sulphuretted trivalent arsenic_____ $As_2O_3$=40.7 g./l.
Pentavalent arsenic as arsenate and monothioarsenate_____. $As_2O_3$=26.3 g./l.
Sulphur as monothioarsenate_____ S=3.5 g./l.

The solution is then treated by air in order to re-oxidise arsenite to arsenate, simultaneously expelling $CO_2$ bound on acidification, and finally reutilised for absorption.

*Example 3.*—In a plant of the type diagrammatically shown in Figure 5, 10,000 m.$^3$/h. (S.T.P.) conversion gas containing 30% $CO_2$ and 0.5 g. $H_2S$/m.$^3$ (S.T.P.) are scrubbed at a 12 atm. pressure in tower 2 by means of 100 m.$^3$/h. of a solution containing under operating conditions potassium carbonate and bicarbonate, potassium arsenite, arsenate and monothioarsenate in such proportions that analysis shows:

Alkalinity titratable by methyl-orange___ $K_2O$=180 g./l.
Non-sulphuretted trivalent arsenic_____ $As_2O_3$=140 g./l.
Pentavalent arsenic as monothioarsenate and arsenate_____. $As_2O_3$=60 g./l.
Sulphur as monothioarsenate_____ S=14.1 g./l.

The gas leaving tower 2 has a residual 0.15% $CO_2$ content and is fully $H_2S$ free, each m.$^3$ of the solution having bound 30 m.$^3$ (S.T.P.) $CO_2$ and 50 g. $H_2S$.

The exhausted solution discharged from tower 2, the sulphur content of which has risen to 14.147 g./liter, is subdivided into two portions, one of which corresponding to 5 m.$^3$/h. is subjected to acidification and deprived of sulphur, the other portion (95 m.$^3$/h.) being subjected to $CO_2$ removal.

The said 5m.$^3$/h. of the solution are introduced into the vessel 23, where the digestion reaction, which has started on the absorption step, is completed, whereupon they are transferred to vessel 25 in which, upon diluting them with water to reduce the $K_2O$ concentration to about 140 g./l., they are contacted with part of the gas to be purified drawn through pipe 1; this being equivalent to employing pure $CO_2$ at a pressure of 3.9 absolute atm. In the 5 m.$^3$/h. solution acidified as above regardless of dilution for the sake of simplicity) the sulphur concentration in the solution is reduced from 14.147 g./liter to 13.2 g./liter; accordingly 0.94 g./liter elemental sulphur equivalent to 4.7 kg./h. (corresponding to 5 kg./h. $H_2S$ carried by the gas) are precipitated. Considering the small sulphur quantity which need be precipitated (0.94 g./liter) the acidification process proceeds very quickly. Upon separation of sulphur the 5m.$^3$/h. solution plus dilution water are added to the remaining 95 m.$^3$/h. solution and subjected together to the $CO_2$ removal. Upon heating up to about 85° C. in 6 the solution reaches the vessel 7 where the digestion process is completed and about 40% of the $CO_2$ bound on the absorption step and acidification is set free in a pure condition due to expansion and discharged through pipe 8 for further use.

The solution is then admitted to tower 10 in which carbon dioxide is expelled from the solution in the previously described manner, and arsenite is oxidised forming additional arsenate in a quantity equalling 14.6 kg./h. $As_2O_3$ corresponding to the arsenate consumption for separating sulphur.

The solution freed from $CO_2$ and sulphur, enriched in arsenate and re-concentrated has re-assumed the original composition and is returned to absorption.

*Example No. 4.*—A gas containing 4.7 g. $H_2S$/$Nm^3$ is scrubbed at atmospheric pressure at a temperature of 60–70° C. by means of a solution which contains on analysis 22.4 g./l. $Na_2O$ titratable by methylorange, 32.3 g./l. $As_2O_3$ as trivalent arsenic, 81.2 g./l. $As_2O_3$ as monothioarsenate and arsenate, 15.4 g./l. S as monothioarsenate and is of pH=7.6. Separation of elemental sulphur starts already during absorption of sulphuretted hydrogen and is pursued in the oxidation and acidification step; 2 kgs. sulphur per m.$^3$ solution precipitate and are separated. The solution is then returned to the absorption step.

What I claim is:

1. Method of removing hydrogen sulphide from a gaseous mixture by the use of a scrubbing liquid comprising the steps of introducing the gaseous mixture into an absorption and digestion zone, contacting said gaseous mixture in the said zone with said scrubbing liquid comprising an aqueous solution containing an alkaline arsenite capable of reacting with the hydrogen sulphide to form a thioarsenite, and containing an alkaline arsenate in the proportion of at least three moles of arsenate per mole of thioarsenite, whereby the thioarsenite is converted to arsenite and arsenate is converted to monthioarsenate, tranferring the monothioarsenate-containing solution from said absorption and digestion zone to an acidification zone and reducing its alkalinity in said last-named zone, whereby monothioarsenate is converted to arsenite and sulphur in elemental state is precipitated, separating and recovering the elemental sulphur, conveying the solution from the acidification zone to an oxidation zone in which part of its arsenite content is oxidized to reform the arsenate consumed in the absorption and digestion zone, and returning the solution from the oxidation zone to the absorption and digestion zone.

2. The method as defined in claim 1, wherein the alkalinity of the solution in the acidification zone is reduced by treating the solution with carbon dioxide.

3. The method as defined in claim 1, wherein the alkalinity of the solution in the acidification zone is reduced by treating the solution with carbon dioxide, and the solution is oxidized in the oxidation zone by treating the solution with oxygen-containing gas, thereby expelling from the solution carbon dioxide absorbed in the acidification zone.

4. Method of removing hydrogen sulphide from a gaseous mixture by the use of a scrubbing liquid comprising the steps of introducing the gaseous mixture into an absorption and digestion zone, contacting said gaseous mixture in the said zone with said scrubbing liquid comprising an aqueous solution containing an ammonium arsenite capable of reacting with the hydrogen sulphide to form an ammonium thioarsenite, and containing an ammonium arsenate in the proportion of at least three moles of arsenate per mole of thioarsenite, whereby the thioarsenite is converted to ammonium arsenite and arsenate is converted to ammonium monothioarsenate, transferring the monothioarsenate-containing solution from said absorption and digestion zone to an acidification zone and reducing its alkalinity by removal of ammonia, whereby monothioarsenate is converted to arsenite and sulphur in elemental state is precipitated, separating and recovering the elemental sulphur, conveying the solution from the acidification zone to an oxidation zone in which part of its ammonium arsenite content is oxidized to reform the arsenate consumed in the absorption and digestion zone, and returning the solution from the oxidation zone to the absorption and digestion zone while adding to the solution ammonia expelled in the acidification zone.

5. Method of removing hydrogen sulphide from a gaseous mixture containing hydrogen sulphide and carbon dioxide by the use of a scrubbing liquid comprising the steps of introducing the gaseous mixture into an absorption, digestion and acidification zone, contacting said gaseous mixture in said zone with said scrubbing liquid comprising an aqueous solution containing an alkaline arsenite capable of reacting with the hydrogen sulphide to form a thioarsenite, and containing an alkaline arsenate in the proportion of at least three moles of the arsenate per mole of thioarsenite, whereby the thioarsenite is converted to the arsenite and the arsenate is converted to monothioarsenate, reacting the monothioarsenate-containing solution in the said zone with the carbon dioxide contained in the gaseous mixture whereby the alkalinity of the solution is reduced and monothioarsenate is converted to arsenite and sulphur in elemental state is precipitated, removing the carbon dioxide-containing solution from said zone and thereafter expelling the carbon dioxide from the solution, separating and recovering elemental sulphur, conveying the solution to an oxidation zone in which part of its arsenite content is oxidized to reform the arsenate consumed in the absorption, digestion and acidification zone, and returning the solution from the oxidation zone to the absorption, digestion and acidification zone.

6. The method as claimed in claim 5, wherein the carbon dioxide is expelled and part of the arsenite content of the solution is oxidized in the oxidation zone by treating the carbon dioxide-containing solution with an oxygen containing gas.

7. Method of removing hydrogen sulphide from a gaseous mixture by the use of a scrubbing liquid comprising the steps of introducing the gaseous mixture into an absorption and digestion zone, contacting said gaseous mixture in said zone with said scrubbing liquid comprising an aqueous solution containing an alkaline arsenite capable of reacting with the hydrogen sulphide to form a thioarsenite, and containing an alkaline arsenate in the proportion of at least three moles of arsenate per mole of thioarsenite, the pH of said aqueous solution having a value at which alkaline arsenite will react with hydrogen sulphide to form a thioarsenite, whereby the thioarsenite is converted to arsenite and arsenate is converted to monothioarsenate, transferring the monothioarsenate-containing solution from said absorption and digestion zone to an oxidation and acidification zone in which part of its arsenite content is oxidized to reform the arsenate consumed in the absorption and digestion zone, thereby reducing the alkalinity of the solution, converting monothioarsenate to arsenite and precipitating sulphur in elemental state, separating and recovering the elemental sulphur, and returning the solution to the absorption and digestion zone.

8. The method as defined in claim 7, wherein part of the arsenite content of the solution is oxidized in the oxidation and acidification zone by treating the solution in said zone with an oxygen-containing gas.

9. Method of removing hydrogen sulphide from a gaseous mixture containing hydrogen sulphide and oxygen by the use of a scrubbing liquid comprising the steps of introducing the gaseous mixture containing hydrogen sulphide and oxygen through a single zone of absorption, digestion, acidification and oxidation, contacting said gaseous mixture in said zone with said scrubbing liquid comprising an aqueous solution containing an alkaline arsenite capable of reacting with hydrogen sulphide to form a thioarsenite, and containing an alkaline arsenate in the proportion of at least three moles of alkaline per mole of thioarsenite, the pH of said aqueous solution having a value at which alkaline arsenite will react with hydrogen sulphide to form a thioarsenite, whereby the thioarsenite is converted to arsenite and the arsenate is converted to monothioarsenate which precipitates sulphur in elemental state and is converted to arsenite, the latter being oxidized to arsenate by the oxygen contained in gaseous mixture thereby acidifying the solution, whereby the concentrations of the arsenite and of the arsenate remain constant while the sulphur is separated and recovered.

10. Method of removing hydrogen sulphide jointly with carbon dioxide from a gaseous mixture by the use of a scrubbing liquid comprising the steps of introducing the gaseous mixture into an absorption and digestion zone, contacting said gaseous mixture in said zone with said scrubbing liquid comprising an aqueous solution containing an alkaline arsenite capable of reacting with the hydrogen sulphide to form a thioarsenite, and containing an alkaline arsenate in the proportion of at least three moles of arsenate per mole of thioarsenite, whereby the thioarsenite is converted to arsenite and arsenate is converted to monothioarsenate, said solution containing an alkali capable of absorbing carbon dioxide in an amount sufficient for carbon dioxide to be simultaneously absorbed by the solution, transferring the exhausted solution containing monothioarsenate from said adsorption and digestion zone to an acidification zone and reducing its alkalinity whereby monothioarsenate is converted to arsenite and sulphur in elemental state is precipitated, separating and recovering the elemental sulphur, conveying the solution to a heated zone to expel the absorbed carbon dioxide, thereafter conveying the solution to an oxidation zone in which part of its arsenite content is oxidized to reform the arsenate consumed in the absorption and digestion zone, and returning the solution to the absorption and digestion zone.

11. Method of removing hydrogen sulphide jointly with carbon dioxide from a gaseous mixture by the use of a scrubbing liquid comprising the steps of introducing the gaseous mixture into an absorption and digestion zone, contacting said gaseous mixture in the said zone with said scrubbing liquid comprising an aqueous solution containing an alkaline arsenite capable of reacting with the hydrogen sulphide to form a thioarsenite and containing an alkaline arsenate in the proportion of at least three moles of arsenate per mole of thioarsenite whereby the thioarsenite is converted to arsenite and arsenate is converted to monothioarsenate, said solution containing an alkali capable of absorbing carbon dioxide in an amount sufficient for carbon dioxide to be simultaneously absorbed by the solution, transferring the exhausted solution containing monothioarsenate from said adsorption and digestion zone to an acidification zone and reducing its alkalinity, whereby monothioarsenate is converted to arsenite and sulphur in elemental state is precipitated, separating and recovering the elemental sulphur, conveying the solution to an oxidation zone and treating the solution in said zone with an oxygen containing gas whereby part of the arsenite content of the solution is oxidized to reform the arsenate consumed in the absorption and digestion zone, and the absorbed carbon dioxide is expelled, and returning the solution to the absorption and digestion zone.

References Cited in the file of this patent

UNITED STATES PATENTS

| | | |
|---|---|---|
| 1,809,818 | Bragg | June 16, 1931 |
| 1,827,082 | Gollmar | Oct. 13, 1931 |
| 1,932,812 | Carvlin | Oct. 31, 1933 |
| 1,971,779 | Gollmar | Aug. 28, 1934 |
| 2,259,409 | Wenzel et al. | Oct. 14, 1941 |

FOREIGN PATENTS

| | | |
|---|---|---|
| 286,633 | Great Britain | Oct. 16, 1928 |